United States Patent [19]

Yamauchi

[11] 3,786,447

[45] Jan. 15, 1974

[54] INFORMATION PROPAGATION PATH SWITCHING DEVICE

[75] Inventor: Fumio Yamauchi, Tokyo-to, Japan

[73] Assignee: Nippon Electric Company, Limited, Tokyo-to, Japan

[22] Filed: Sept. 22, 1972

[21] Appl. No.: 291,514

[30] Foreign Application Priority Data

Oct. 13, 1971 Japan .............................. 46/81120

[52] U.S. Cl. .................... 340/174 TF, 340/174 SR

[51] Int. Cl. ....................... G11c 11/14, G11c 19/00

[58] Field of Search .............................. 340/174 TF

[56] References Cited

UNITED STATES PATENTS

| | | | |
|---|---|---|---|
| 3,530,446 | 9/1970 | Perneski | 340/174 TF |
| 3,731,288 | 5/1973 | Marsh | 340/174 TF |

*Primary Examiner*—James W. Moffitt

*Attorney*—Richard C. Sughrue et al.

[57] ABSTRACT

Magnetic domains are switched between adjacent propagation paths by varying the perpendicular magnetic field applied to a sheet of domain holding material when the domain is at a junction of two propagation paths. The propagation paths are formed by soft patterned magnetic material on the surface of the sheet. At the junction point the domain will move to one of two possible further points which are located respectively in the first and second propagation paths. The said two further points are located with respect to said junction point so that the movement of the domain to one or the other depends upon the size of the domain, which in turn is controlled by the magnetic field applied perpendicular to the sheet.

3 Claims, 3 Drawing Figures

INFORMATION PROPAGATION PATH SWITCHING DEVICE

BACKGROUND OF THE INVENTION

This invention relates to an information propagation path switching device for use in magnetic memories for an information handling system. More briefly, this invention relates to a switching device for cylindrical magnetic domain (referred to as a bubble domain) propagation paths composed of soft magnetic material thin-film patterns. This invention is applicable to a magnetic bubble repertory dialer memory and a parallel arithmetic unit of a pattern recognition equipment.

It is known in the art that a bubble domain is produced in a sheet of single crystal material such as rare earth orthoferrite and uniaxial garnet when a uniform static magnetic field of suitable field intensity is applied perpendicular to the sheet. It is also known that the domain is propagated along a magnetic field gradient when a nonuniform field is applied to the sheet. The diameter of such domain is so small that it is possible to realize a large capacity and high density magnetic memory element. These facts are reported in "IEEE TRANSACTIONS ON MAGNETICS," VOL. MAG-5, No. 3, November issue, 1969, Pages 554 to 557.

One of the best known methods for providing the magnetic field gradient for causing domain propagation is to utilize soft thin-film magnetic material. One example of such technique is shown in FIG. 3 of the cited reference, in which soft magnetic material thin-film is formed into T and I shaped patterns by evaporated deposition process; the film is magnetized by an external rotating magnetic field; and the bubble domains are propagated with the resultant nonuniform magnetic field. Furthermore, it is also disclosed in copending U.S. Pat. application Ser. No. 220,665, (inventor: Fumio Yamauchi), filed on Jan. 25, 1972 and assigned to the assignee herein, that a similar effect can be obtained by the arrangement of Y-shaped soft magnetic material thin-film patterns.

However, when such circuits having the soft magnetic material thin-film for moving the bubble domains are employed for information processing, it is necessary to provide means for transferring information (bubble domain) from one propagation path to a designated other propagation path, in response to a command signal.

A first example for switching the bubble domain propagation paths is shown in FIG. 1 in "IEEE TRANSACTIONS ON MAGNETICS," VOL. MAG-6, No. 3, September issue, 1970, page 447. In this method, the switching operation is carried out by a magnetic field gradient which is made locally by supplying current to a conductor loop. According to this method, an additional process for arranging such a conductor loop is required. Also, the wiring process for connecting the loop to any external power source is necessary, thus lowering the quality of the product.

A second example is as shown in FIG. 3 of the same paper, in which a hard magnetic material film having high coercive force is used for the above-mentioned switching operation. In this method, the domain propagation paths are switched with the hard film magnetized depending on the increase of the rotating magnetic field as required. It will be also clear that an additional process of manufacturing the hard film is needed in this case.

A third example is as shown in FIG. 2 of the "IEEE TRANSACTIONS ON MAGNETICS," VOL. MAG-7, No. 3, September issue, 1971, page 738, in which the revolving direction of the rotating magnetic field is altered for such a purpose. In this method, the manufacturing process is relatively simple, but the structure is quite complicated. Briefly, complicated circuits must be used for changing the direction of rotation.

As a fourth example, there is the one disclosed in FIG. 1 of the U.S. Pat. No. 3,530,446, issued on Sept. 22, 1970, which is a method for modulating the rotating magnetic field. In this method, a number of information may be hardly handled in parallel because of the complexity in structure.

SUMMARY OF THE INVENTION

It is, therefore, one object of this invention to provide an information propagation path switching device free from the above-mentioned disadvantages of the prior art methods and circuits.

The information propagation path switching device of this invention comprises: a magnetic material sheet capable of retaining bubble domains in a plane substantially perpendicular to an easy axis; means for applying a static magnetic field substantially perpendicular to the sheet so as to maintain the bubble domains in a predetermined size; means for modulating the magnetic field for switching bubble domain propagation paths; means for applying a rotating magnetic field in the plane of the sheet; and means for moving the domains. The last-mentioned means, in one example, consists of a plurality of Y-shaped patterns made of a soft magnetic material thin-film having Y-shaped strokes and arranged on the sheet, each stroke forming an angle of approximately 120° with one another so that the domains in the sheet may be propagated due to the sequential magnetic change caused by the rotating magnetic field. At least one branching point is provided in part of the arrangement of the soft magnetic thin-film material. The branching point includes a position, *b-o*, where a bubble domain exists at a given moment and two positions, *c-o* and *c'-o*, to which the domain may be subsequently moved. The distance between the positions *b-o* and *c-o* is different from that between *b-o* and *c'-o*, and the position *b-o* is connected to one of the two positions *c-o* and *c'-o* through soft magnetic thin-film material.

DETAILED DESCRIPTION OF THE INVENTION

Figure 1:
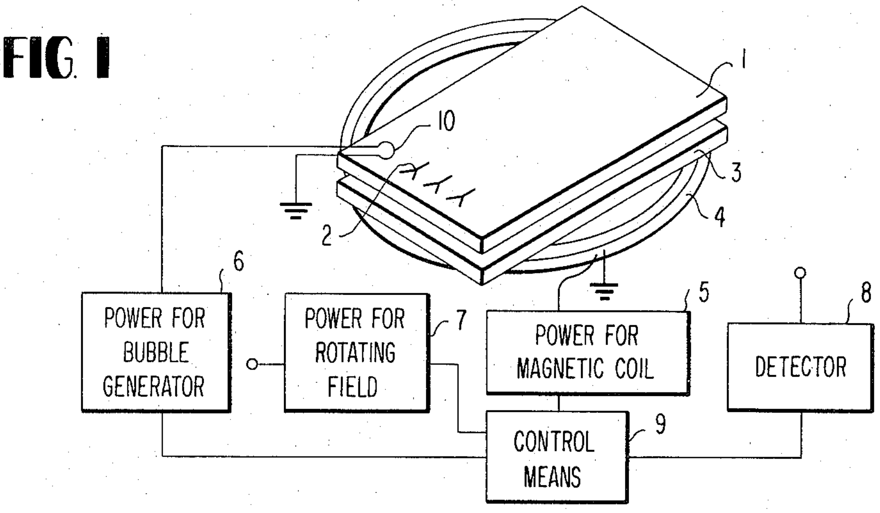
FIG. 1 shows a schematic diagram of this invention.

In FIG. 1, which shows a schematic diagram of the structure of this invention, the device comprises: a bubble domain generating section 10; a power source 6 for generating bubble domains; means 2 for moving the bubble domains; a single crystal thin sheet 1 made of magnetic material for holding the domains; a magnet 3 for applying a uniform static magnetic field perpendicular to the surface of the sheet 1; a power source 7 for propagating the domains; a detector circuit 8; a coil 4 and a power source 5 for modulating the static magnetic field; and a control power source 9 for controlling these power sources. For simplicity, means (coil) for applying a rotating magnetic field parallel to the plane of the sheet 1 is not shown in the drawing. Each of the individual elements except for the particular arrangement of the means 2, is a conventional device known in the art.

Figure 2:
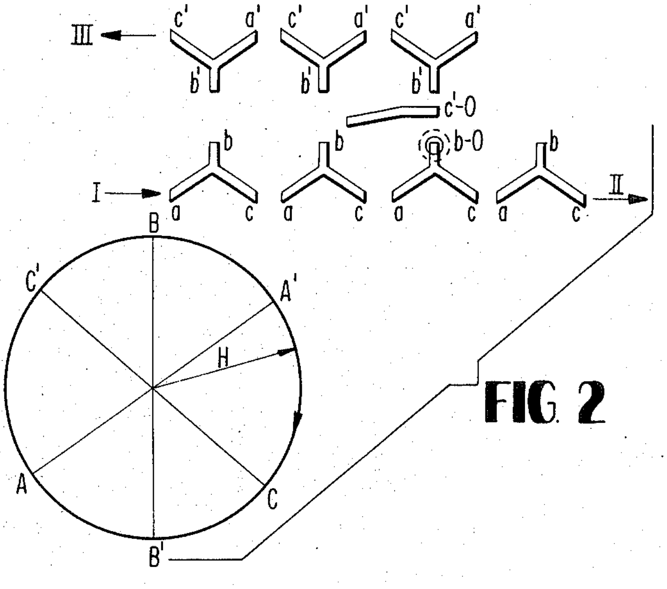
FIG. 2 shows the first embodiment of this invention.

In FIG. 2, which shows the first embodiment of this invention, only soft magnetic material thin-film patterns relevant to the gist of this invention are shown. More specifically, the patterns are provided with Y-shaped patterns each of which forms an angle of approximately 120 degrees with one another.

It is assumed here that the static magnetic field is applied perpendicular to the surface of the sheet 1 of FIG. 1 from behind the paper to the front by the magnet 3 so that a bubble domain negative in polarity is produced on the upper surface of the sheet 1. Under this condition, the application of a magnetic field H, rotating counterclockwise in the plane parallel with the surface of the sheet 1 causes a bubble domain entering from position I to be moved in the general direction from left to right. When the magnetic field H is in the direction A the domain is held at terminal a of the Y-shaped pattern 30. As the magnetic field H moves successively to directions B and C, the domain moves successively to terminals *b* and *c* of pattern 30. When the magnetic field H is again in the A direction the domain jumps to the a terminal of the Y-shaped pattern 32. The domain movement continues in the latter described manner. Thus, after two and one third revolutions of the rotating magnetic field H, the field will be in direction B and the domain position *b-o*, indicated by solid circle 38, will be held at on Y-shaped pattern 34. When the magnetic field H rotates in direction C the domain can move to either of positions *c-o* on pattern 34 and *c'-o* on pattern 36. A distance between the positions *c-o* and *b-o* is greater than that between the positions *c'-o* and *b-o*. Also, the positions *c-o* and *b-o* are linked through the soft magnetic material thin-film, and the domain (in the position *b-o*) is normally propagated therefrom to the position c-o due to the magnetic interaction between the soft magnetic film and the domain present at the position *b-o*. However, if the static magnetic field is modulated by exciting coil 4 of FIG. 1, the diameter of the domain present at the position *b-o* is changed to become larger, as indicated by a dotted circle 40 in comparison with the diameter when not modulated. As a result, move intensive magnetic interaction is exerted between the position *c'-o* and the bubble domain present at the position *b-o*, and the domain is propagated to the position *c'-o*. Further rotation of the magnetic field results in movement of the domain in the upper propagation path to an output position III.

In this manner, it is possible to switch the flow of information (bubble domain) from the first propagation path, between position I and position II, to a second propagation path which propagates the domain to position III. It will be readily understood that reverse operations may also be readily accomplished.

As seen from FIG. 2, the pattern 36, having one end designated as terminal *c'-o*, is not a straight bar but is angled downward on the left side. The purpose of angling bar 36 downward on the left side is to further remove the left end of bar 36 from *b'* terminal of pattern 20 to further prevent a domain held at *b'* of pattern 20 from jumping to bar 36. It will be appreciated that a domain which jumps from pattern 20 to pattern 36 would cause erroneous operation of the magnetic domain propagation circuit.

As a more practical application of the device of this invention, the device is adaptable to the switching of the information propagation paths in a magnetic bubble repertory dialer memory shown in FIG. 1 of the foregoing reference "IEEE TRANSACTIONS ON MAGNETICS," VOL. MAG-7, No. 3, September issue, 1971, Page 738.

Figure 3:
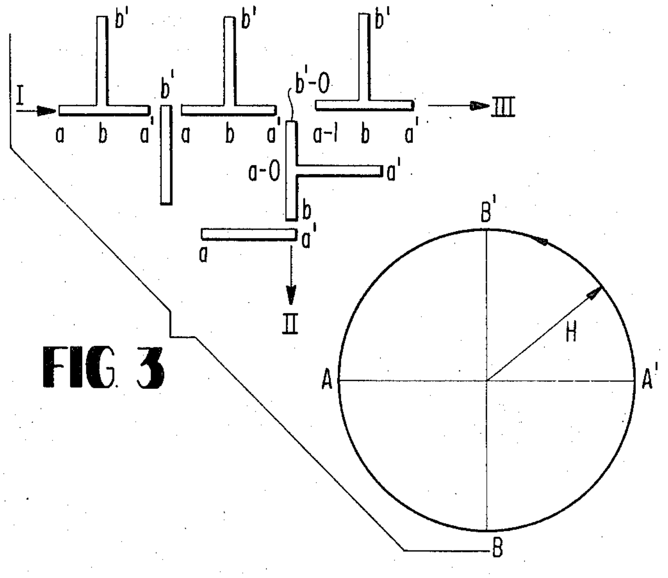
FIG. 3 shows the second embodiment of this invention.

FIG. 3 shows the second embodiment of this invention wherein T- and I-shaped soft magnetic material thin-film patterns are adopted in place of Y-shaped ones.

As a bubble domain entering from position I in a manner similar to the case of FIG. 2 is moved in the order of $a \rightarrow b \rightarrow a' \rightarrow b' \rightarrow a$ depending on the rotation of the rotating magnetic field H and at a position *b'-o*, it may select either one of positions *a-l* and *a-o*. After the domain has reached the position *a-o*, depending on the diameter of the domain similar to the case of FIG. 2, it is propagated to a position II. However, if the static magnetic field is modulated by the coil 4 in FIG. 1, the domain diameter is increased, goes to the position *a-l* and subsequently is propagated to a position III. Thus, the bubble domain propagation paths can be easily switched with the device of the invention.

As has been described above, the design of the present invention markedly simplifies the structure and manufacturing process as compared with prior-art methods described above. Also, the parallel processing of information is more efficiently performed.

It will be apparent however that a number of alternatives and modifications can be made within the scope of the present invention defined by the appended claims.

What is claimed is:

1. An information propagation path switching device comprising: a sheet of magnetic material capable of holding bubble domains in a plane substantially normal to an easy axis; means for applying a static magnetic field substantially perpendicular to the sheet so as to keep the bubble domains at a predetermined size; means for applying a rotating magnetic field in the plane of the sheet; a first plurality of soft magnetic thin-film elements arranged on said sheet to form a first propagation path for propagating a domain along said first path in response to rotation of said planar magnetic field, said elements including a junction element having first and second end points connected together by said soft magnetic thin-film material and being arranged so that a domain at said first point will move to said second point as said planar magnetic field rotates from a first direction to a second direction; a second plurality of soft magnetic thin-film elements arranged on said sheet to form a second propagation path for propagating a domain along said second path, said second path including one of said elements having a third point positioned adjacent said first point and being closer thereto than is said second point, said element further being oriented so that a domain at said first point will move to said third point rather than said second point as said planar magnetic field rotates from said first to said second direction, if said domain is larger than some minimum size; and means for modulating a magnetic field perpendicular to said sheet to control the size of said domain, at least at said first point, to thereby control the transfer of said domain from said first point to said second or third point.

2. An information propagation path switching device as claimed in claim 1 wherein said first and second plurality of thin-film soft magnetic elements comprises, a plurality of Y-shaped patterns made of thin-film soft magnetic material having Y-shaped patterns and arranged on said sheet, each stroke forming an angle of approximately 120° with one another so that domains in said sheet may be moved due to the successive magnetic change caused by said rotating magnetic field, said first, second and third points comprising a branching junction wherein a domain at said first point may be propagated to either said second or third points depending on the size of said domain.

3. An information propagation path switching device as claimed in claim 1 wherein said first and second plurality of thin-film soft magnetic elements comprises, a plurality of I and T-shaped patterns made of thin-film soft magnetic material and arranged on said sheet to form two propagation paths, said first, second and third points comprising a branching junction wherein a domain at said first point may be propagated to either said second or third points depending on the size of said domain.

* * * * *

UNITED STATES PATENT OFFICE
CERTIFICATE OF CORRECTION

Patent No. 3,786,447 Dated January 15, 1974

Inventor(s) Fumio YAMAUCHI

It is certified that error appears in the above-identified patent and that said Letters Patent are hereby corrected as shown below:

Column 3, line 32 - after "domain" delete "position b-o"

line 33 - after "at" insert -- position b-o -- line 34 - after "rotates" delete "in" and insert -- to -- line 47 - after "40" insert -- , -- line 49 - after "result," delete "move" and insert -- more --

Signed and sealed this 1st day of October 1974.

(SEAL)
Attest:

McCOY M. GIBSON JR.
Attesting Officer

C. MARSHALL DANN
Commissioner of Patents